(12) United States Patent
Doyle et al.

(10) Patent No.: US 9,055,041 B2
(45) Date of Patent: Jun. 9, 2015

(54) DEVICE CERTIFICATE BASED APPLIANCE CONFIGURATION

(75) Inventors: Ronald P. Doyle, Raleigh, NC (US); John R. Hind, Raleigh, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 11/848,573

(22) Filed: Aug. 31, 2007

(65) Prior Publication Data

US 2009/0063849 A1 Mar. 5, 2009

(51) Int. Cl.
*H04L 29/06* (2006.01)
*H04L 29/12* (2006.01)
*H04L 9/32* (2006.01)
*H04L 29/08* (2006.01)

(52) U.S. Cl.
CPC .......... *H04L 63/06* (2013.01); *H04L 29/12839* (2013.01); *H04L 61/6022* (2013.01); *H04L 63/12* (2013.01); *H04L 9/3247* (2013.01); *H04L 9/3268* (2013.01); *H04L 67/125* (2013.01)

(58) Field of Classification Search
USPC ................. 713/100, 156, 172, 187, 189–193; 726/9, 10; 380/259, 281, 286
See application file for complete search history.

(56) References Cited

U.S. PATENT DOCUMENTS

| 6,823,454 | B1 | 11/2004 | Hind et al. | |
|---|---|---|---|---|
| 6,976,163 | B1 | 12/2005 | Hind et al. | |
| 2005/0081029 | A1* | 4/2005 | Thornton et al. | 713/156 |
| 2006/0064582 | A1* | 3/2006 | Teal et al. | 713/156 |
| 2007/0143629 | A1* | 6/2007 | Hardjono et al. | 713/189 |
| 2007/0204166 | A1* | 8/2007 | Tome et al. | 713/182 |

\* cited by examiner

*Primary Examiner* — Brandon Hoffman
(74) *Attorney, Agent, or Firm* — Steven M. Greenberg, Esq.; CRGO Law

(57) ABSTRACT

Embodiments of the present invention address deficiencies of the art in respect to configuring a computing appliance and provide a method, system and computer program product for device certificate based virtual appliance configuration. In one embodiment of the invention, a virtual appliance secure configuration method can be provided. The method can include mounting non-volatile storage to the virtual appliance, retrieving a device certificate from the mounted storage and extracting a signature from the device certificate, activating the virtual appliance in a network domain and acquiring an adapter address and unique identifier for the virtual appliance, and authenticating the signature with the adapter address and unique identifier to ensure a unique active instance of the virtual appliance.

14 Claims, 2 Drawing Sheets

US 9,055,041 B2

DEVICE CERTIFICATE BASED APPLIANCE CONFIGURATION

REFERENCE TO CO-PENDING APPLICATIONS FOR PATENT

The present application is related to the following co-assigned U.S. patent application, which is incorporated herein by reference herein:

U.S. application Ser. No. 11/848,557 entitled "DEVICE CERTIFICATE BASED APPLIANCE CONFIGURATION", filed on Aug. 31, 2007.

BACKGROUND OF THE INVENTION

1. Field of the Invention

The present invention relates to the field of configuring a computing device for deployment into a computing environment and more particularly to securely configuring a virtual appliance in a computing environment.

2. Description of the Related Art

Computing devices range from the simplistic to the complex, from the smallest form factor to room-consuming behemoths. Despite the great disparity in nature of computing devices, all share a common characteristic—the need for configuration. Simplistic computing devices can be enabled prior to delivery to the customer through factory level configuration, while larger systems often require configuration by the customer on site, or by an on site expert installing the computing system. For many devices, configuration is not a one time event, but an ongoing process as device upgrades are applied throughout the product lifecycle of a computing device.

The simplest of computing devices oftentimes involve only a single fixed storage unit like a hard disk drive, a processor, dynamic memory and external low volume storage such as a memory key or floppy disk drive. To configure the computing device, then, requires little more than manual application of configuration data at boot time, often through a basic input output system (BIOS) interface. It is also well known to apply firmware and flash configuration of a computing device through firmware configuration applications distributed along with the configuration data itself. Equally as well known, the network communications interface of a computing device can be used as a conduit through which a configuration can be applied to a computing device.

Configuring a single computing device can be a relatively simple and straightforward affair, however, managing the wide-scale configuration of many hundreds if not thousands of computing devices can be more challenging. To effectuate such an extensive configuration, oftentimes information technologists perform the configuration in a pilot instance of a computing environment within a virtualized host. Once the efficacy and stability of the configuration can be verified in the virtualized host, it is of little consequence to move the virtualized host in file form to the target computing device for activation as a configuration of the target computing device.

Of note, the use of a virtualized host to implement a configuration can be especially helpful in configuring a computing appliance. A computing appliance is known in the art as a self-contained information technology (IT) system that can be plugged into an existing IT infrastructure to carry out a single purpose, making it comparable to a consumer appliance such as the toaster. Computing appliances have gained a foothold in enterprise IT systems because of their simplicity, reliability, ease of use and lower cost compared with general purpose computers. The appliance is designed to address a specific IT operation from within a closed architecture that may contain an operating environment, storage and specific applications. The purpose of an appliance can be to provide additional processing power, network storage or monitoring, or anti-virus and security.

Though the computing appliance can be implemented as a single purpose stand alone computing platform, a virtual form of the computing appliance has evolved to provide an even greater degree of flexibility. In this regard, a virtual appliance is a computing appliance deployed within a virtual environment hosted by a computing platform. To the end user, there is little if any functional distinction between a computing appliance and a virtual appliance, however, from a deployment perspective, distributing a virtual appliance to the end user can be orders of magnitude more simple to manage—especially in configuring and updating the virtual appliance.

BRIEF SUMMARY OF THE INVENTION

Embodiments of the present invention address deficiencies of the art in respect to configuring a computing appliance and provide a novel and non-obvious method, system and computer program product for device certificate based virtual appliance configuration. In one embodiment of the invention, a virtual appliance secure configuration method can be provided. The method can include mounting non-volatile storage to the virtual appliance, retrieving an encrypted device certificate from the mounted storage, verifying the device certificate signature, activating the virtual appliance in a network domain using constraints in the device certificate to ensure a unique active instance of the virtual appliance.

In one aspect of the embodiment, a virtualized storage device is mounted on the virtual appliance. The image of a storage device is selected from the group consisting of a floppy drive, a rewritable compact disc (CDRW), a rewritable digital video disc (DVDRW), a universal serial bus (USB) key, or any of a number of varieties of flash memory cards/sticks. In another aspect of the embodiment, a secure storage device is mounted to the virtual appliance, and the secure storage device can be a real or virtualized security chipset. In either circumstance, in yet another aspect of the embodiment, a device certificate is retrieved from the key ring using symmetrical decryption where the key ring is located on the mounted storage.

Notably, the method additionally can include extracting a signed extension from the device certificate, identifying one or more configuration parameters, and configuring the virtual appliance according to the configuration parameters. Also, the method additionally can include periodically verifying the logic performing the authenticating of the signature and of the adapter address to ensure a unique active instance of the virtual appliance.

In another embodiment of the invention, a virtual appliance data processing system can be provided. The system can include a virtual environment and a virtual appliance executing within the virtual environment. The system also can include device certification validation logic. The logic can include program code enabled to retrieve an encrypted device certificate from mounted storage and to verify the signature from the device certificate, to activate the virtual appliance in a network domain using constraints from the certificate and ensure a unique active instance of the virtual appliance.

The mounted storage might be an image of a storage device selected from the group consisting of a floppy drive, CDRW, DVDRW, a universal serial bus (USB) key, or any of a number of varieties of flash memory cards/sticks. Alternatively, the mounted storage might be a secure storage device such as a real or virtualized security chipset. In either case, the layer 2 network adapter address known as the media access control (MAC) address and a password are used to form a key which is used to decrypt the keyring held on the mounted device so that the device certificate can be recovered. In addition, the system can include signed extensions disposed in the device certificate, the extensions defining configuration parameter (s) for the virtual appliance which might include layer 3 network address constraints. Finally, as yet another option, the system can include integrity verification logic including program code enabled to verify the device certification validation logic.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for device certificate based virtual appliance configuration. In accordance with an embodiment of the present invention, a device certificate can be established for a virtual appliance. The device certificate can include a signature created by a certificate authority such as the appliance manufacturer, a public key for the virtual appliance, and a formal name that can include, by way of example, a layer two (2) virtual network adapter address for the virtual appliance in combination with a layer three (3) network address or name for the virtual appliance. One or more extensions can also be included in the certificate, for example configuration limitations to be applied to a configured instance of the virtual appliance. Finally, the device certificate can be placed in a key ring along with the private key for the public key in the device certificate and the key ring is symmetrically encrypted using a different hash of a customer supplied password/pin and the virtual appliance layer 2 network adapter address.

The key ring can be distributed on portable media for use in configuring one or more instances of the virtual appliance. In this regard, a customer can use the key ring to configure any number of instances of the virtual appliance, though only a single active instance can be permitted due to the requirement of a unique layer 2 network address on an active network segment and constraints on the allowed layer 3 network address contained in the certificate extensions.

Specifically, device certificate validation logic can decrypt the key ring in the intended target device using a customer supplied password and the layer 2 network adapter address, for instance a MAC address, of the running virtual appliance. As the layer 2 network address must be unique within a LAN segment this has the side effect of assuring only one instance of a virtual device is active on a segment. Moreover, configuration limitations within the device certificate can be applied to the virtual appliance to yet further manage and control the capabilities of the virtual appliance including constraints on the layer 3 addresses and names used by the appliance.

Figure 1:
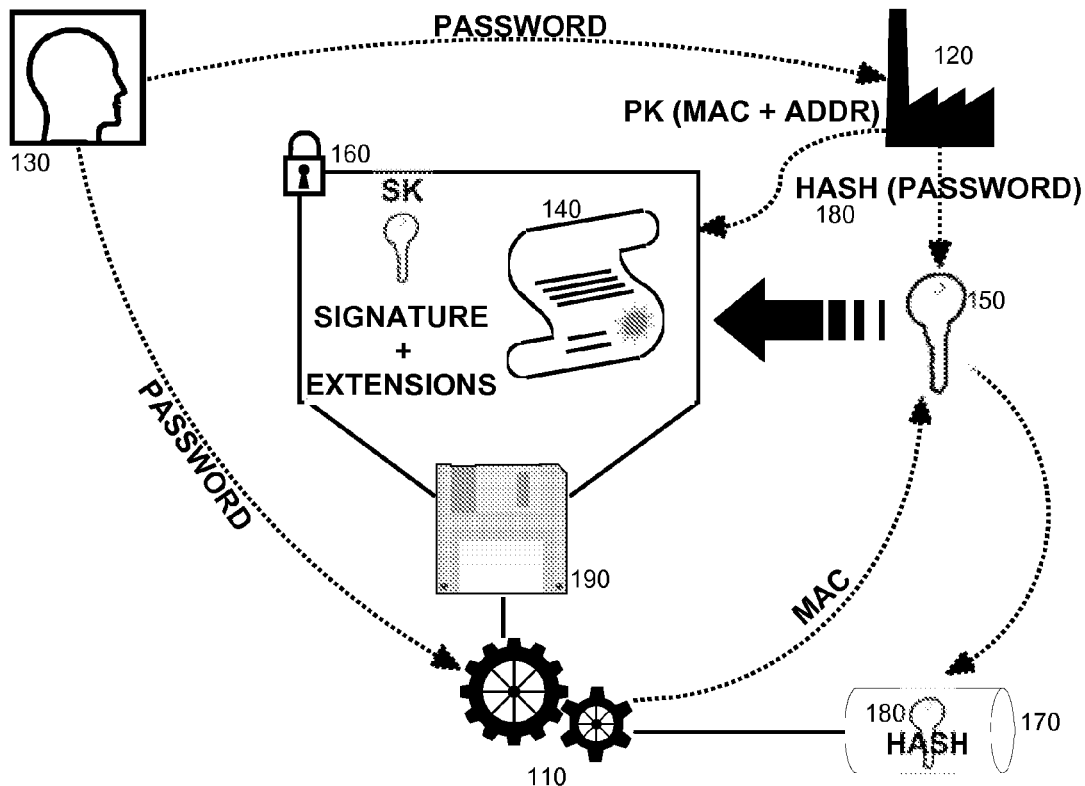
FIG. 1 is a pictorial illustration of a process for device certificate based virtual appliance configuration.

In illustration, FIG. 1 pictorially depicts a process for device certificate based virtual appliance configuration. As shown in FIG. 1, a virtual appliance 110 can be deployed by a customer 130 utilizing a configuration provided by the manufacturer 120. Specifically, the manufacturer 120 can issue a device certificate 140 containing constraints on both the configuration and operation of the appliance and place this certificate with its corresponding public key SK in a key ring 160 protected by a key 150 formed by hashing the hash 180 of the customer 130 provided password and a MAC address which must be used by the network adapter of the running appliance 110. The encrypted key ring is then transmitted to the customer who makes it available to the appliance 110 as a virtual device 190

The virtual appliance 110 can extract the MAC (layer 2) address from it's network adapter and can retrieve a password from the customer 130. Thereafter, the virtual appliance 110 can hash the MAC address concatenated with a hash of the password 180 to reconstruct the symmetric key 150 which allows the key ring to be unlocked giving access to the device certificate and its corresponding symmetric key. The virtual appliance 110 then can verify the signature in the device certificate and can use the certificate name and extensions for various configuration functions including constraining either or both of the layer 3 network address and the name of the virtual appliance 110.

A device certificate 140 can be signed by the certificate authority of the manufacturer and can be verified by comparing the hash of the signed fields (such as extensions, name, device public key) with the signature value decrypted by the public key of the certificate authority that resides on the appliance hard drive 170 along with this verification code. Note that the customer 130 password hash 180 optionally can be placed on the hard drive 170 of the virtual appliance 110.

Inherent to the access of the device certificate 140 is the requirement that a unique adapter layer 2 address subsist for the virtual appliance 110. As such, the utilization of the device certificate 140 ensures only a single active instance of the virtual appliance 110 on the LAN segment by the customer 130. Additionally, configuration limitations on the use of the virtual appliance 110 can be applied through the device certificate 140 as specified within the device certificate 140 in the form of extensions or by naming. One such limitation may be in the layer 3 network addresses or names allowed hence further restricting the use of the appliance within the network of the customer.

Figure 2:
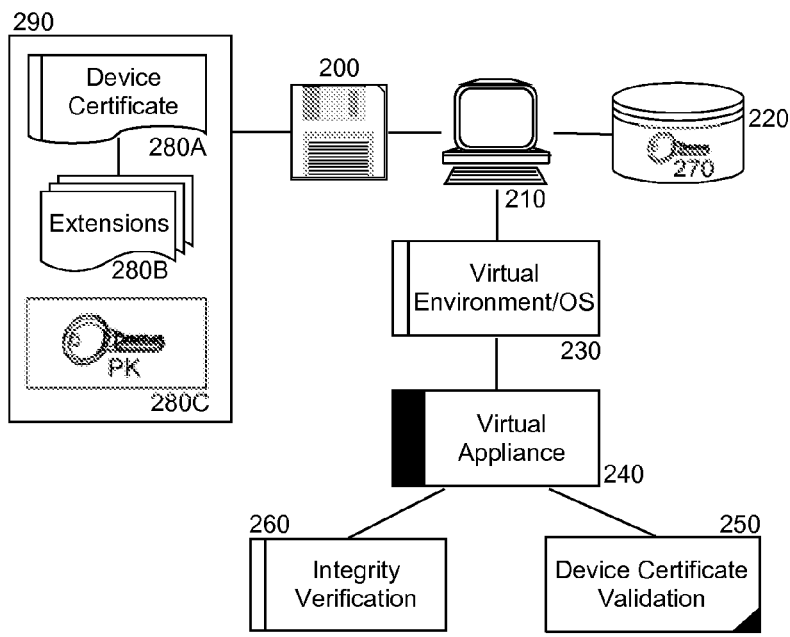
FIG. 2 is a schematic illustration of a virtual appliance enabled for device certificate based configuration.

In more particular illustration, FIG. 2 schematically depicts a virtual appliance data processing system enabled for device certificate based configuration. The system can include a host computing device 210 and corresponding writable storage 220 supporting the operation of a virtual environment 230. The virtual environment 230 can execute within a separate operating system, or the virtual environment 230, itself can be the operating system supported by the host computing device 210. A virtual appliance 240 can be disposed within the virtual environment 230 and can access the physical network interface provided for the host computing device 210 through virtual environment 230 as a virtual adapter layer 2 address and a virtual layer 3 network address.

Device certification validation logic 250 can be coupled to the virtual appliance 240. The device certification validation logic 250 can include program code enabled to configure the virtual appliance 240 at the time of initialization and to ensure the unique instance of the virtual appliance 240 as a form of licensure control. In this regard, device security memory 200, for instance a virtual or real floppy disk or security chipset, can include a key ring 290. The key ring 290 can include a device certificate 280A one or more device certificate extensions 280B disposed within the device certificate 280A, and a private key 280C for the virtual appliance 240. Optionally, additional certificates (not shown) can be included in the key ring 290 for use by other applications such as connecting with a lightweight directory access protocol (LDAP) server for directory services or a Web server for serving secure content.

The key ring 290 further can be encrypted with a symmetric key which is the hash of the virtual appliance 240 adapter MAC address concatenated with the hash 270 of a password originally provided by the customer. A copy of the password hash 270 can be stored in writable storage 220 to facilitate automatic activation of the appliance without requiring human interaction. In operation, the program code of the device certificate validation logic 250 uses the public key of the manufactures certificate authority to verify the device certificates signature which assures all of the other fields of the certificate have not been modified since it was issued.

Notably, the device certificate 280A once validated contains restrictions that are applied to the initialization of the network stack. In one aspect of the embodiment, the network address can include a combination of "host.domain_name" and IP address for the virtual appliance 240. In a second aspect of the embodiment, however, the dynamic assignment of an IP address to the virtual appliance 240 through the dynamic host control protocol (DHCP) can be accommodated by omitting the IP address and the usual checks are performed periodically during execution to make sure that those address have not been modified in the domain name server (DNS) and that the DNS has not been spoofed.

As a further measure of protection, integrity verification logic 260 can be coupled to the virtual appliance 240. The integrity verification logic 260 can include program code enabled to verify the integrity of the device certification validation logic 250. For instance, the program code of the integrity verification logic 260 can be enabled to compare a hash of the device certification validation logic 250 to a known hash. Alternatively, the program code of the integrity verification logic 260 might employ a scheme such as that used by the open source Common Security Services Manager of the Common Data Security Architecture (CDSA) in order to ensure that the device certification validation logic 250 has not been modified or otherwise compromised.

Figure 3:
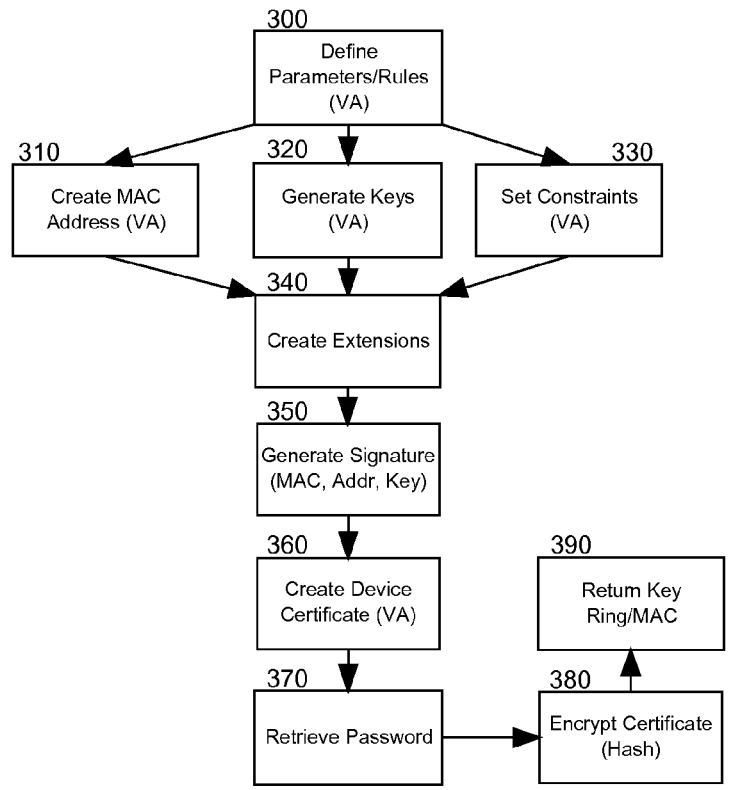
FIG. 3 is a flow chart illustrating a process for generating a key ring enclosing a device certificate for device certificate based virtual appliance configuration; and, FIG. 4 is a flow chart illustrating a process for configuring a virtual appliance with the key ring of FIG. 3.

Integral to the operation of the virtual appliance data processing system of FIG. 2, a key ring can be generated for a specific distribution of a virtual appliance to a specific customer and provided to the customer as a file either in the form of an image of removable media or as a parameter to the virtual driver representing a security chip set for the virtual appliance. In illustration, FIG. 3 is a flow chart depicting a process for generating a key ring enclosing a device certificate and private device key for the virtual appliance configuration. Beginning in block 300, one or more virtual appliance configuration parameters or rules can be defined for the virtual appliance and encapsulated within corresponding device extensions.

In block 310 MAC address (layer 2) is created for the virtual appliance network adapter from the block of addresses assigned to the manufacturer using a process similar to the way a manufacturer of real network cards would assign a MAC to each card on the production line. In block 320 a private/public key pair is generated. In block 330 the layer 3 network constraints are set using interaction with the customer to set values appropriate for the network segment where the appliance will be deployed. At a minimum this means choosing a host name and domain name for the appliance instant. In block 340 extensions for various configuration parameters are created to represent the licensed use of the appliance instance.

In block 350, a digital signature can be generated using the private key of the manufacturer to encrypt the hash over the other portions of the certificate, and in block 360, signed device certificate, which has been generated, can be placed into a key ring along with the private key for the virtual appliance and other trusted root certificates including the manufacturers certificate. In block 370, a password can be retrieved from the customer intended to receive the virtual appliance. Thereafter, in block 380, the key ring can be symmetrically encrypted using a hash of the virtual appliance network adapter MAC address concatenated with a hash of the password. Finally, in block 390 the encrypted key ring and the MAC address can be returned to the customer in an appropriate form.

Figure 4:
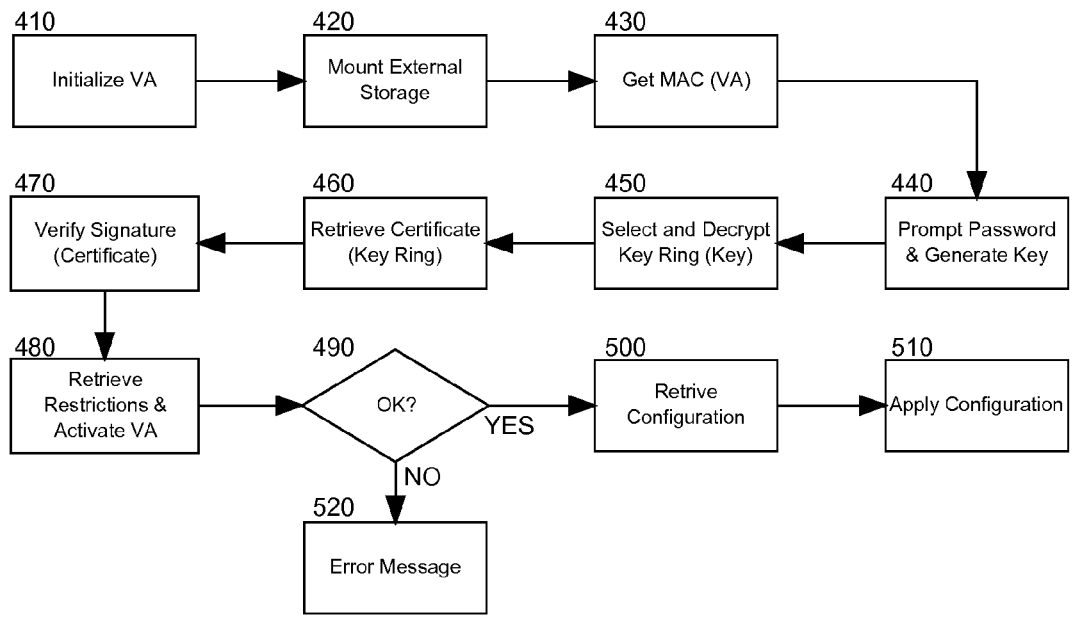

The key ring produced according to the process of FIG. 3 can be utilized at the time of initialization for the virtual appliance. In particular, the content of the key ring—specifically the device certificate—can be used to ensure not only a single active instance of the virtual appliance, but also to configure the single active instance of the virtual appliance according to the configuration parameters reflected within the extensions in the device certificate. In more particular illustration, FIG. 4 is a flow chart illustrating a process for configuring a virtual appliance with the key ring of FIG. 3. Beginning in block 410, the virtual appliance can be initialized for use in a network domain. In block 420, external storage such as a virtual floppy disk, virtual security chipset can be mounted for access by the virtual appliance.

In block 430, an adapter address for the virtual appliance network adapter can be retrieved. Of note, the customer must configure the virtual environment with the MAC address assigned by the manufacturer. In block 440, the end user can be prompted for a password which is hashed and saved in the appliance storage for automated access on future initializations. Thereafter, in block 450 the key ring can be selected and decrypted using a symmetric encryption key produced as a hash of the MAC concatenated with the password hash. Once the key ring has been decrypted, the device certificate can be retrieved from the key ring in block 460 and in block 470 the certificate can be verified by hashing its non-signature fields and comparing that with the signature field decrypted using the manufactures public key taken from the manufacturer certificate also found on the key chain. Again, of note, the manufacturer certificate can be validated and ultimately a public root key or root certificate which is part of the appliance code can be referenced to complete the process of generating trust in the device certificate. At this point other checks can be preformed such as checking the certificate is being used within its valid date range and for the purpose issued.

In block 480, the layer 3 network restrictions can be retrieved from the certificate and the layer 3 network can be activated within these constraints. If there where any problems up to this point as determined in decision block 490 then an error message can be generated in block 520 and the appliance can stop operating. Otherwise, in block 500 the non-network virtual appliance configuration can be retrieved from the device certificate extensions and in block 510, the virtual appliance configuration parameters can be applied to the virtual appliance instance being initialized.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A virtual appliance data processing system comprising:
a virtual environment;
a virtual appliance executing within the virtual environment; and,
device certification validation logic comprising program code enabled to
retrieve a device certificate from a universal serial bus (USB) key, the device certificate including a signature created by a certificate authority, a public key for the virtual appliance, a formal name for the virtual appliance, and one or more extensions specifying configuration limitations for an instance of the virtual appliance and to extract the signature from the device certificate,
activate the virtual appliance in a network domain and acquire a media access control (MAC) address and a combination of host.domain name and Internet protocol (IP) address for the virtual appliance, and
authenticate the signature with the media access control (MAC) address and the combination of host.domain name and Internet protocol (IP) address based upon the one or more extensions in the device certificate to ensure a unique active instance of the virtual appliance.

2. The system of claim 1, wherein the formal name for the virtual appliance includes a layer two virtual network adapter address for the virtual appliance in combination with one of a layer three network address and a name for the virtual appliance.

3. The system of claim 1, wherein the device certification validation logic further comprises program code enabled to
verify the device certificate by hashing non-signature fields of the device certificate and comparing the hashed non-signature fields of the device certificate with a signature field decrypted using a manufacturer public key.

4. A virtual appliance data processing system comprising:
a virtual environment;
a virtual appliance executing within the virtual environment; and
device certification validation logic comprising program code enabled to
retrieve a device certificate from mounted storage, the device certificate including a signature created by a certificate authority, a public key for the virtual appliance, a formal name for the virtual appliance, and one or more extensions specifying configuration limitations for an instance of the virtual appliance and to extract the signature from the device certificate,
activate the virtual appliance in a network domain,
acquire an adapter address and unique identifier for the virtual appliance, and
authenticate the signature with the adapter address and the unique identifier based upon the one or more extensions in the device certificate to ensure a unique active instance of the virtual appliance.

5. The system of claim 4, wherein
the mounted storage is storage selected from the group consisting of a floppy drive and a universal serial bus (USB) key.

6. The system of claim 4, wherein
the mounted storage is static memory in association with a security chipset for the virtual appliance.

7. The system of claim 4, wherein
the adapter address is a media access control (MAC) address.

8. The system of claim 4, wherein
the network address is a combination of host.domain name and Internet protocol (IP) address.

9. The system of claim 4, wherein
the network address is a unique identifier.

10. The system of claim 4, further comprising
a key ring containing the device certificate for the virtual appliance, the one or more extensions disposed with the device certificate, and also a private key for the virtual appliance.

11. The system of claim 4, wherein the device certification validation logic further comprises program code enabled to
extract the one or more extensions disposed in the device certificate,
identify at least one configuration parameter in the one more extensions for the virtual appliance, and configure the virtual appliance according to the at least one configuration parameter.

12. The system of claim 4, further comprising
integrity verification logic comprising program code enabled to verify the device certification validation logic.

13. The system of claim 4, wherein the formal name for the virtual appliance includes a layer two virtual network adapter address for the virtual appliance in combination with one of a layer three network address and a name for the virtual appliance.

14. The system of claim 4, wherein the device certification validation logic further comprises program code enabled to
verify the device certificate by hashing non-signature fields of the device certificate and comparing the hashed non-signature fields of the device certificate with a signature field decrypted using a manufacturer public key.

* * * * *